Nov. 17, 1959 — D. F. COOK — 2,912,857
FLOW MEASURING SYSTEM
Filed Oct. 11, 1954 — 2 Sheets-Sheet 1

INVENTOR.
D. F. Cook
BY Robb & Robb
Attorneys

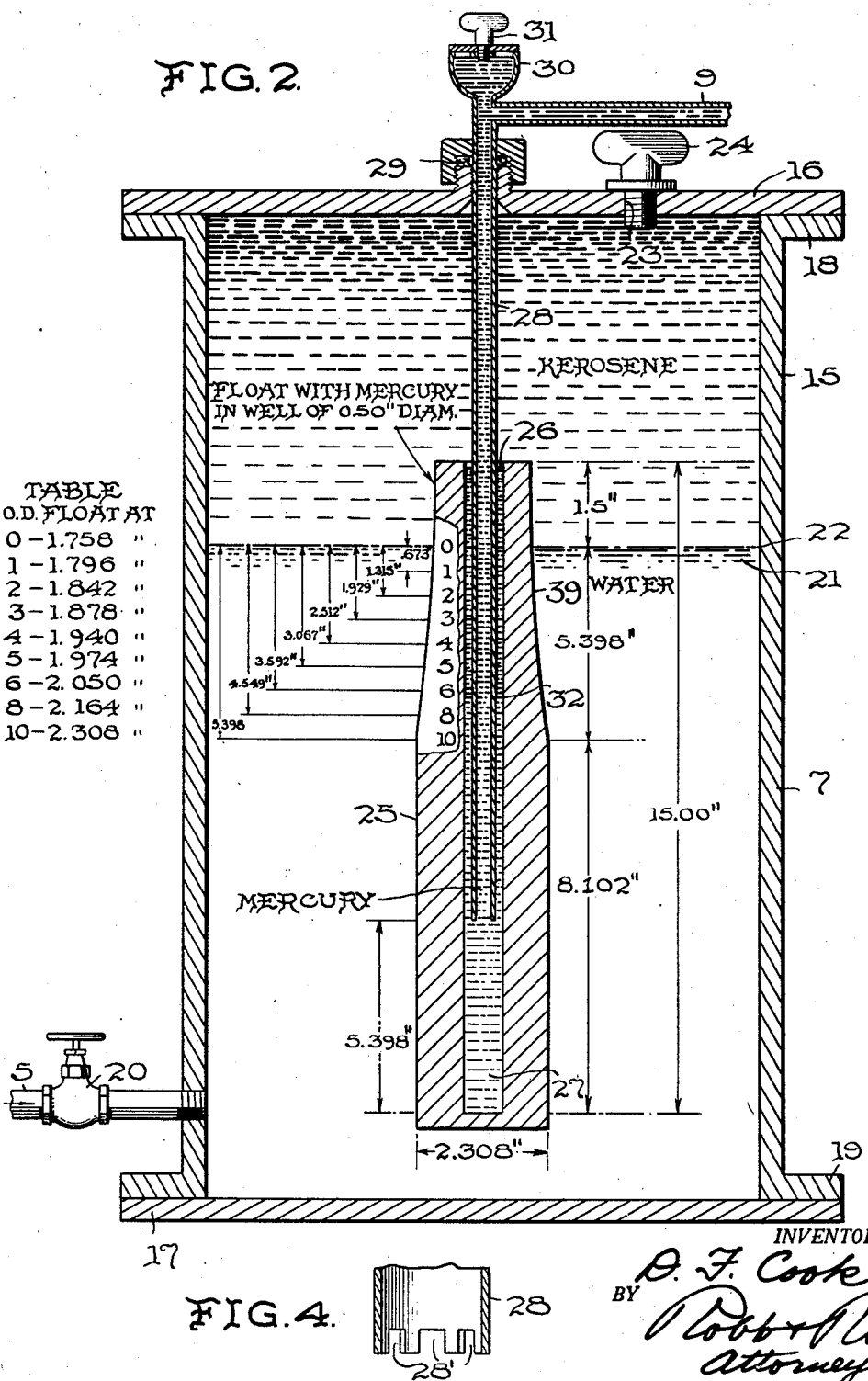

United States Patent Office 2,912,857
Patented Nov. 17, 1959

2,912,857

FLOW MEASURING SYSTEM

Donald F. Cook, Lawrence, Kans.

Application October 11, 1954, Serial No. 461,371

2 Claims. (Cl. 73—205)

The present invention relates to an improved differential amplifier for fluid flow recording systems and the like, and more particularly to improved means for utilizing the velocity and the pressure differential between the static pressure and the velocity of the fluid travelling through a conduit to control suitable recording devices for recording total quantities of fluid flow through the conduit and/or for recording fluid velocity in the conduit, or to control other devices that may be utilized in systems which operate in response to the difference in fluid pressure in a conduit caused by flow of a fluid through a conventional orifice plate, venturi, or other similar device.

Where the flow of fluid through a pipe line, particularly a large pipe line, is to be recorded, standard flow meters heretofore available usually have a recording range of approximately 20 to 1 from maximum to minimum flow. This range is quite limited, and the provision of suitable means for increasing the same is highly desirable. Moreover, in addition to this limited recording range, standard flow meters usually lack the high degree of sensitivity to small variations in flow which is essential to accurate recording of data relating to the flow of fluid.

Accordingly, a primary objective of the present invention is to provide an improved differential pressure amplifier means for fluid flow recording systems and the like, thereby rendering the systems more sensitive to small pressure differences on the order of under 0.1 ft. per second fluid velocity, without restricting the upper limit of velocity which can be measured, and giving to the systems a greater recording range on the order of 200 to 1 maximum to minimum flow, this objective being attained without necessitating the use of large or bulky equipment, so that the apparatus making up an entire system may be portable and easily connected to a fluid conduit.

Another object is to provide an improved differential amplifier according to the preceding objective, which is extremely simple to manufacture, assemble and install in a fluid flow recording system at a minimum of expense.

A further object is to provide a fluid pressure differential amplifier which is adapted to be utilized in conjunction with a fluid flow recording system having recording instruments operably responsive to the velocity of fluid in a conduit, said amplifier including a housing adapted to hold a quantity of the fluid admitted from the conduit, such as water, and a quantity of supernatant fluid, such as kerosene, the housing having a hollow float therein containing a well of balancing fluid, such as mercury, heavier than the supernatant fluid. The bottom of the housing is adapted to communicate with the fluid flowing through the conduit, so that the static pressure and the velocity pressure of the fluid in the conduit can be applied to the subjacent fluid in the housing. The supernatant fluid in the upper end of the housing is subjected only to static pressure of the fluid flowing in the conduit as by means of a hollow tube projecting through the top of the housing and into the well in the hollow float. The float and its well are so proportioned that the pressure difference applied to the subjacent and supernatant fluids is balanced by a relatively small volume of the fluid in the float well, as the float is suspended partially in the subjacent and partially in the supernatant fluids. Therefore, the fluid contained in the float well and in the tube which projects into the well can be utilized to control the operation of recording devices for recording the velocity, volume, or total flow of fluid through the conduit, with only small volumes of a balancing fluid in the float, and with a high degree of sensitivity to variations in the velocity of the fluid in the conduit, as well as over a wide range of velocity, as will hereinafter more specifically appear.

Other objects and advantages of the invention will be hereinafter described or will become apparent to those skilled in the art, and the novel features thereof will be defined in the appended claims.

In the drawings:

Fig. 2 is an enlarged view in vertical section of the differential amplifier;

Figure 3:
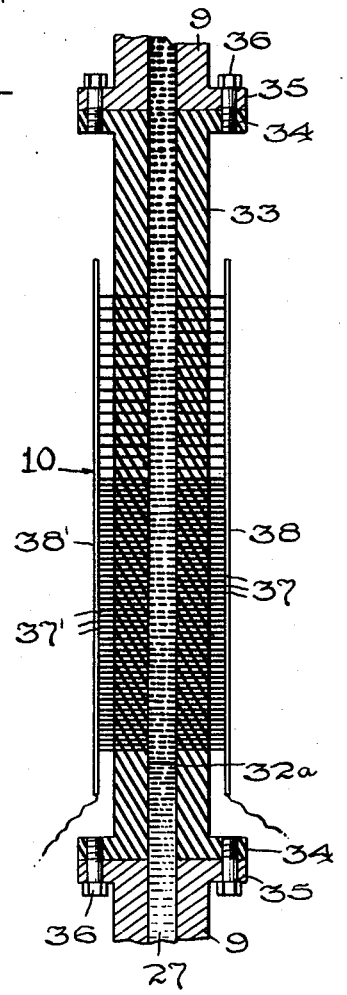

Fig. 3 is an enlarged view in vertical section of a fluid-electrical converter which forms a part of the recording system for controlling the readings of various electrical recording instruments in the system, said converter being responsive to pressure differences amplified by the defferential amplifier; and Fig. 4 is an enlarged, fragmentary view in vertical section of the inner, free end of the tube which projects into the float shown in Fig. 2.

Figure 1:
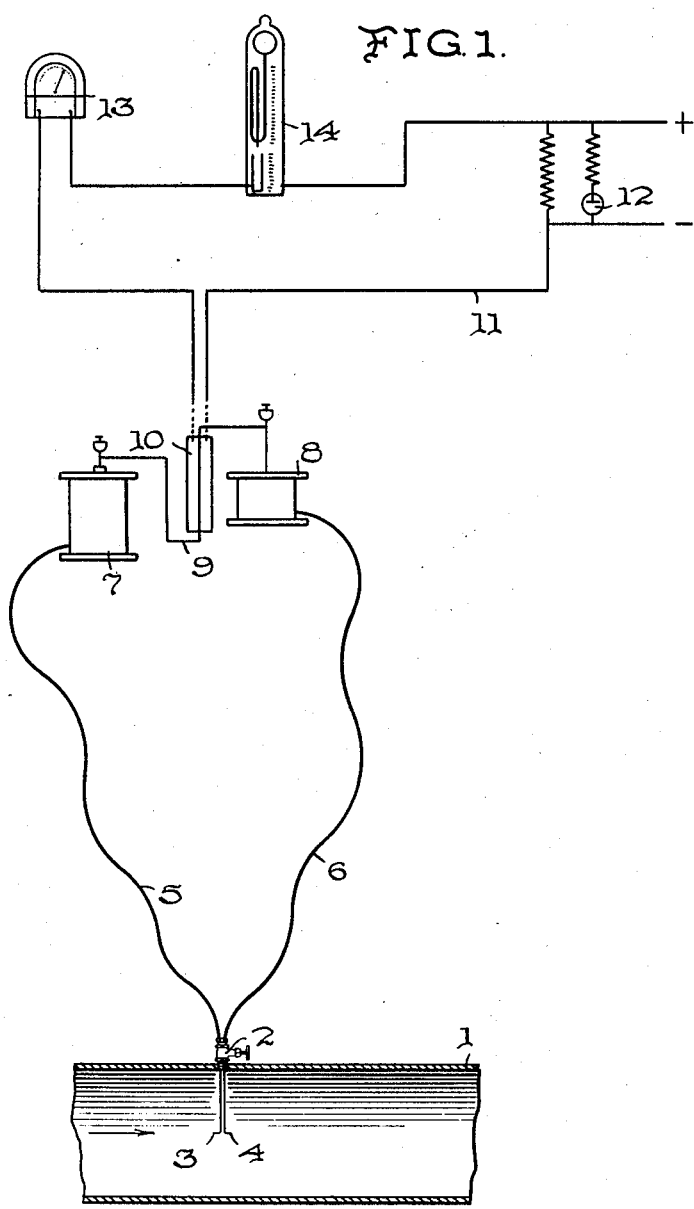
Fig. 1 is a diagrammatic view of a fluid flow recording system embodying therein a fluid pressure differential amplifier according to the invention.

In Fig. 1 of the drawings, there is shown a system for recording the flow of fluid through a conduit 1, which fluid, for the purposes of the present description, will be considered to be water, but it is to be understood that it could be any other fluid. Mounted in the conduit 1 as by means of a conventional tap 2 is a pair of Pitot tubes 3 and 4. Pitot tubes are well-known in the art, and therefore, the tubes 3 and 4 need not be specifically described, except that the Pitot tube 3 has its open end pointed oppositely to the direction of flow of fluid through the conduit, as indicated by the arrow in Fig. 1, whereas the Pitot tube 4 has its open end pointed in the direction of flow of fluid through the conduit 1. Thus, the Pitot tube 3 is subjected to static pressure plus velocity, while the Pitot tube 4 is subjected only to static pressure. However, the effective static pressure on Pitot tube 4 is slightly less than the static pressure of a stationary fluid, since the static pressure is reduced at the open end of the Pitot tube by an amount proportional to the square of the velocity of fluid flow past the Pitot tube. Therefore, in the ensuing description and in the appended claims, where the static pressure effective on the low-pressure Pitot tube 4 is referred to, it should be understood that such static pressure is the effective static pressure noted above.

A fluid line 5 extends into the tap 2 and is connected to the Pitot tube 3 in any suitable manner, and another fluid line 6 leads into the tap 2 and is connected to the Pitot tube 4 in any suitable manner. The differential amplifier with which my invention herein is primarily concerned, is generally designated 7, and the fluid line 5 leads from the Pitot tube 3 to the lower end of the differential amplifier 7, while the fluid line 6 leads from the Pitot tube 4 to the lower end of a fluid reservoir generally designated 8. A fluid line 9 interconnects the upper end of the differential amplifier with the upper end of the reservoir 8, and at an intermediate portion, the line 9 is provided with means, generally designated 10, for converting increases of fluid velocity in the main conduit 1 into uniform increases of electrical current flowing through a circuit 11 in which the converter means 10 is interposed. For the purposes of the following description, the means 10 will be referred to as a fluid-electro converter.

The circuit 11 preferably receives its current from a battery or other source of direct current which is connected to a voltage regulator tube 12 for maintaining a constant E.M.F. or input for the circuit 11. Interposed in the circuit 11 are two conventional electrically operated meter devices in the form of a milliammeter 13 which is preferably calibrated to read water velocity in the conduit 1 in terms of ft. per second, or otherwise as desired, and an electrolytic meter 14 for recording the total water flow in the conduit 1. The meters 13 and 14 are merely illustrative of types of meters which may be utilized in the circuit 11 to indicate specific data, and it should be understood that any other suitable devices or any combination of meters may be utilized so as to control any desired instrumentality in response to the fluid in conduit 1, or to give readings of and record specific data relating to the flow of fluid through the conduit 1.

Referring to Fig. 2, the differential amplifier 7 is shown in detail as including a generally cylindrical housing 15 having top and bottom closures 16 and 17, respectively, which are secured to radially projecting flanges 18 and 19, respectively at the top and bottom ends of the housing 15, by any suitable fastening means (not shown). The fluid line 5 which, by reason of the fact that it is connected to the Pitot tube 3 which is responsive to both static pressure and velocity of the fluid in the conduit 1, and will be referred to as the high pressure line or source of pressure, leads into the housing 15 adjacent to the bottom thereof, and is preferably provided with a valve 20 for controlling the flow of fluid through a port or inlet-outlet opening into the housing 15 from the line 5.

Since the conduit 1 has previously been described as having water flowing therethrough, the lower portion of the housing 15 will therefore admit a body of water 21 up to, for instance, a level designated at 22. The space between the water line 22 and the top of the housing 15 is adapted to be filled with a fluid having a lesser specific gravity than water, for instance, kerosene, through a filler opening 23 which is suitably closed by a screw plug 24. The reservoir 8 previously described preferably contains a suitable quantity of water in its lower portion and a suitable quantity of kerosene above the water, the water being admitted into the reservoir 8 through the line 6 which, by reason of the fact that it is connected with the Pitot tube 4, is responsive to only static pressure in conduit 1, and will be referred to as the low pressure line or source of pressure.

Disposed in the housing 15 and partially floating in the water 21 and partially in the kerosene, is a float 25 having an axially extended well 26 extending substantially to the bottom of the float. In the well 26 is a body of balancing fluid 27, said fluid 27 preferably being mercury, and the fluid line 9 previously described is adapted to establish fluid communication between the mercury in the well 26 and the reservoir 8 to complete the fluid circuit running from Pitot tube 3 to Pitot tube 4. Accordingly, variations in the velocity of fluid flowing through conduit 1 will effect related variations in the high and low pressures in the lines 5 and 6, with the result that the float 25 will be balanced or suspended in the housing 15 at different elevations in accordance with the difference in the high and low pressures to which it is subjected, this difference representing essentially the velocity of the fluid through the conduit 1.

Centrally of the housing 15, the line 9 is formed with an axially extended tube 28 which extends through a sealing gland 29 in the top closure 16 and into the mercury well 26. The tube 28 is preferably provided at its upper end with a filler cup 30 and a closure 31 therefor. At its lower end, the tube 28 is preferably provided with one or more suitable openings or notches 28' each constituting a port, as shown in Fig. 4, to allow the flow of balancing fluid or mercury into the tube 28 when the bottom of the float well abuts the bottom of the tube 28, as will be hereinafter described.

The fluid-electro converter 10 for controlling the flow of electric current to the meters 13 and 14 under the control of the differential amplifier 7 is preferably of a type which will respond to variations in the level of mercury in the line 9, and with particular reference to Fig. 3, it will be noted that with the float in the differential amplifier disposed at the level shown, the mercury in the float well 26 rises to a level designated 32, and the mercury column in the tube 9 rises to a corresponding level designated 32a in the converter, as shown in Fig. 3. Since the level 32a would rise as the float 25 rises in the housing 15, responsive to increases in fluid velocity through the conduit 1, the mercury column in the tube 9 can advantageously be utilized as a means for controlling the flow of electric current through the meters 13 and 14.

Accordingly, the fluid-electro converter 10 preferably is in the form of a conduit section 33 made of suitable insulating material and having flanges 34, 34 at its opposite ends for connection with complemental flanges 35, 35 on the spaced ends of the line 9 in which the conduit section 33 is interposed, said flanges 34 and 35 being suitably secured together in fluid-tight abutting relation in any suitable manner, as by means of screws 36. Embedded in the insulating material of the conduit section 33 is a plurality of resistance wires 37, these resistance wires 37 extending radially through one side of the body of the conduit section 33 at spaced intervals, one above the other, so as to be successively contacted by the column of mercury in the conduit as the mercury column rises in the conduit section 33 of the converter. Disposed in opposed relation to the resistance wires 37 and also projecting radially through the opposite side of the body of the conduit section 33 for contact with the column of mercury is a second set of resistance wires 37', each of which is disposed in diametrically opposed relation to a resistance wire 37. The resistance wires 37 and 37' are respectively connected to connector bars or collector members 38 and 38', these collectors 38 and 38' being interposed in the circuit 11 as seen in Fig. 1, whereby as the column of mercury in conduit 9 rises in the conduit section 33, the mercury will successively bridge the gaps between opposed resistance wires 37 and 37' to progressively introduce the resistances into the circuit in parallel relation to one another. The mercury column will rise in the conduit section 33 of fluid line 9 responsive to upward movements of the float 25 in the amplifier device 7, and the resistance wires 37 and 37' and the float and float well must be so proportioned as to effect predetermined changes in the readings of the meters 13 and 14, responsive to predetermined upward and downward movements of the float 25.

The fluid circuit in line 9 is completed from the mercury level 32a by a fluid which is relatively lighter in weight than mercury, such as, for instance, kerosene, and the upper portion of the reservoir 8 is therefore preferably provided with a suitable quantity of kerosene therein superposed above a body of the water or other fluid flowing through the conduit 1, said latter fluid being admitted into and filling the lower portion of the reservoir 8.

As above mentioned, the amount that the mercury level 32a in the conduit section 33 rises in response to predetermined upward movements of the float can be varied at will by altering the diameters of the mercury well 26, and it should also be understood that other dimensions may be varied to produce any desired result upon the movement of the mercury column in relation to movement of the float. However, I have found the ideal ratio of float to mercury column movement to be such that the mercury column will rise 1.00" in the conduit section 33 upon a rise of 0.999" with the float 25 in the differential amplifier 7, the differential pressure in the lines 5 and 6 being balanced with a mercury column of .001". This result is preferably attained by providing a float having an axial well of a length of 15.00" and a maximum outside diameter of 2.308" and having a mercury well therein of a diameter of 0.50", the outside diameter of the float 25 gradually decreasing from a point 6.898" from the top of the float to a point 1.50" from the top of the float so that from zero to 10 ft. per second velocity of fluid in the conduit 1, the mercury column in the conduit section 33 will rise in increments equal to the increase of velocity in the conduit 1, and at 10 ft. per second velocity of fluid in the main conduit, the bottom of the tube 28 in well 26 of the float 25 will abut the bottom of the well. Up until the time that the bottom of the tube 28 engages the bottom of the well 26, the amount of mercury rise in the conduit section 33 of the fluid-electro converter 10 is a direct straight line function, not of the pressure differences existing in the fluid lines 5 and 6, but of the velocity of the fluid in the conduit 1, whereas after the bottom end of tube 28 abuts with the bottom of the well 26, the differential amplifier 7 will cease to operate as an amplifier, and the rise of the mercury column in the conduit section 33 will then be directly proportional to increases in pressure differences in the fluid lines 5 and 6.

Since uniform increases of fluid velocity in the conduit 1 are to be translated into uniform increases of electrical current under the control of the fluid-electro converter 10, the resistance wires 37 and 37' will be so arranged as to attain this result. For instance, the resistance wires may be so located that each successive pair of resistance wires 37 and 37' will be brought into the circuit responsive to a fluid velocity increase of 0.2 ft. per second, this increased velocity effecting a rise in the mercury column in the fluid-electro converter 10 of 0.1". When the fluid velocity in the conduit 1 has increased from zero to 10 ft. per second, and the amount of rise of the mercury column in the fluid-electro converter 10 becomes proportional to increases in pressure differences in the fluid lines 5 and 6, instead of being a direct straight line function of the velocity of the fluid in the conduit 1, the pairs of resistance wires will be spaced farther apart, but they are still preferably so spaced that for each 0.2 ft. per second increase in fluid velocity in the main conduit 1, one more pair of parallel resistance wires 37 and 37' will be brought into the circuit. Accordingly, the fluid-electro converter 10, under the control of my novel differential amplifier device 7 will produce an equal electric current increase in the circuit 11 for each corresponding increase in fluid velocity in the conduit 1, provided, of course, that the source of direct current for the circuit 11 has a constant E.M.F. It should be understood that my differential amplifier is extremely sensitive to small variations in fluid velocity, and therefore, when utilized in association with means for translating velocity increases into equal increases in electric current, such as the fluid-electro converter 10 herein disclosed, the fluid-electro converter may readily be arranged and constructed so as to vary the electric current responsive to velocity changes of 0.1 ft. per second or less, without in any way restricting the upper limit of velocity which may be measured.

In order to accomplish the above results, when utilizing a float having the aforementioned dimensions and being of such a material that at zero velocity of the fluid in the conduit 1 the float 25 will assume a position such as that shown in Fig. 2, with the top of the float 25 projecting 1.5" above the water level 22 and rising 5.398" upon a fluid velocity increase in the conduit 1 from 0 to 10 ft. per second, the upper portion of the float 25 is tapered on a curve starting at a point 6.898" from the top of the float, as previously described. The taper is generally designated 39 in Fig. 2 and is graduated from zero to 10 to correspondingly represent feet per second velocity of fluid in the conduit 1. The distances that these graduations are spaced apart range progressively from .673" to 5.398", as indicated by the dimensions noted in Fig. 2, and the outside diameter of the float 26 at the respective graduation points from zero to 10 should be on the order of the diameters indicated in the table designated "O.D. Float At" associated with Fig. 2 ranging from 1.758" to 2.308" from the zero graduation point to the 10 graduation point. It is to be understood that these specific dimensions which have been indicated for the float 25, and the specific taper at the upper end of the float 25, as well as other dimensions such as the diameter of the well, the inside and/or outside diameter of the tube 28, may be changed as desired, or, when the differential amplifier is to be utilized with a device such as the fluid-electro converter of Fig. 3, the inside diameter of the conduit section 33 may be varied, and all of these variations can be calculated to have a desired effect upon the sensitivity of a recording system embodying the present invention.

It should be noted that the sensitivity of my differential amplifier is in no way impaired by friction caused by movement of mechanical elements such as are utilized in many types of meters and recorders of fluid flow, and therefore, my differential amplifier renders recording systems more accurate than those heretofore known to me.

While the specific details of the invention have been herein shown and described, still other changes and alterations may be resorted to without departing from the spirit thereof as defined in the appended claims.

I claim:

1. In a fluid flow recorder of the class described, including means for recording data relating to the flow through a conduit of fluid having a pressure differential, control means for controlling said recording means, and means for operating said control means, that improvement wherein the operating means comprises a pressure responsive differential amplifier having a closed housing, a fluid line connecting the conduit to the lower portion of the housing to apply relatively high fluid pressure from said conduit to the lower portion of the housing in proportion to the rate of fluid flow, another fluid line connecting the conduit to the upper portion of said housing to apply relatively low fluid pressure from said conduit to the upper portion of said housing in proportion to the static pressure of the fluid in said conduit, said housing containing a subjacent body of fluid in its lower portion and a supernatant body of fluid in its upper portion, a float buoyantly suspended in said bodies of fluid, said float having a well containing a balancing fluid therein, the top of said well being open for communication with the supernatant fluid, and a tube communicating with said low pressure line and extending into the balancing fluid in said well, whereby pressure differences imposed upon the subjacent and supernatant bodies of fluid in said housing through the respective high and low pressure lines will cause said float to rise and fall in proportion to the pressure differences and resulting in displacement of a small volume of said balancing fluid between the float well and the tube aforesaid, and said control means being interposed in said low pressure line and operably responsive to displacement of said balancing fluid.

2. A fluid flow recorder as defined in claim 1, wherein the recording means comprises at least one electrically operated meter operatively responsive to variations in the supply of electric current thereto, the means for controlling the recording means including a plurality of pairs of resistance elements extending into said low pressure line in spaced relation to one another in the path of the balancing fluid in said low pressure line, an electrical circuit including a source of electric current connecting said resistance elements with said meter, and said balancing fluid consisting of a liquid having a high electrical conductivity and serving to bridge the space between the resistance elements of each pair as the balancing fluid is displaced in the low pressure line responsive to varied pressure differentials in the high and low pressure lines to successively introduce into the electrical circuit consecutive pairs of resistance elements to progressively vary the electric current supplied from the source of current to the meter, said low pressure line having interposed therein between the control means aforesaid and the conduit a reservoir containing a body of supernatant fluid corresponding to the supernatant fluid in the amplifier housing and a body of subjacent fluid corresponding to the subjacent fluid in the amplifier housing.

References Cited in the file of this patent

UNITED STATES PATENTS

| | | |
|---|---|---|
| 1,041,432 | Cole | Oct. 15, 1912 |
| 1,568,724 | Cox | Jan. 5, 1926 |
| 1,649,602 | Ledoux et al. | Nov. 15, 1927 |
| 1,757,968 | Ledoux | May 13, 1930 |
| 1,891,810 | Gianolio | Dec. 20, 1932 |

FOREIGN PATENTS

| | | |
|---|---|---|
| 252,202 | Germany | Oct. 16, 1912 |
| 205,669 | Great Britain | Oct. 25, 1923 |
| 345,870 | Great Britain | Apr. 2, 1931 |
| 883,062 | France | Mar. 15, 1942 |